United States Patent [19]

Lampert

[11] 4,121,159
[45] Oct. 17, 1978

[54] METHOD FOR THE SYNCHRONIZATION OF A TRANSMISSION PATH

[75] Inventor: Ernst Lampert, Unterpfaffenhofen, Germany

[73] Assignee: Siemens Aktiengesellschaft, Berlin & Munich, Germany

[21] Appl. No.: 195,062

[22] Filed: Oct. 28, 1971

[30] Foreign Application Priority Data

Nov. 6, 1970 [DE] Fed. Rep. of Germany ....... 2054734

[51] Int. Cl.² .......................... H04B 1/10; H04L 7/00
[52] U.S. Cl. ..................................... 325/65; 178/69.1; 325/58; 325/473; 325/139
[58] Field of Search .................. 178/69.5 R, 69.1; 325/32, 34, 49, 139, 42, 47, 65, 139, 145, 30, 323, 473, 58; 179/15 BS

[56] References Cited

U.S. PATENT DOCUMENTS

| | | | |
|---|---|---|---|
| 3,305,636 | 2/1967 | Webb | 325/47 |
| 3,432,619 | 3/1969 | Blasbalg | 325/22 |
| 3,447,085 | 5/1969 | DeHaas et al. | 178/69.5 R |
| 3,475,558 | 10/1969 | Cahn | 179/15 BA |
| 3,509,471 | 4/1970 | Puente | 178/69.5 R |
| 3,566,268 | 2/1971 | Webb | 325/58 |
| 3,588,747 | 6/1971 | Rusho | 325/139 |
| 3,617,892 | 11/1971 | Hawley et al. | 325/139 |
| 3,665,472 | 5/1972 | Kartchner et al. | 325/42 |
| 3,706,933 | 12/1972 | Bidell et al. | 325/42 |
| 3,713,025 | 1/1973 | McNair | 325/58 |

*Primary Examiner*—Howard A. Birmiel
*Attorney, Agent, or Firm*—Hill, Gross, Simpson, Van Santen, Steadman, Chiara & Simpson

[57] ABSTRACT

A method for synchronizing apparatus on the receiving side of a time multiplex or code multiplex transmisson system with apparatus on the transmitting side of the system, in particular in a system which operates in accordance with the SSMA technique, with which system the information is transmitted in a broad frequency band compared with the base band occupied by the information wherein a rapid frequency change modulated oscillation is transmitted by the transmitter at the beginning of transmission so that each frequency element is submitted to a digital phase modulation during transmission which is characteristic therefor in such a way that the frequency band which is occupied by this signal corresponds at least approximately to the frequency band which is occupied in a normal case of operation, whereby the carrier to be transmitted is phase shift keyed by a very rapidly clocked code with a long code period. The coding of the combined frequency and phase shift keyed signal transmitted prior to communication may contain fewer elements per code period, so code-phase-synchronization can be acquired more rapidly.

8 Claims, 2 Drawing Figures

METHOD FOR THE SYNCHRONIZATION OF A TRANSMISSION PATH

BACKGROUND OF THE INVENTION

1. Field of the Invention

This invention relates to a method for synchronizing the devices on the receiving side with those on the transmitting side of a transmission system operating on a time multiplex or code multiplex basis. In particular, such a system utilizes the SSMA technique where the information is transmitted in a broad frequency range, compared with the base band which is occupied by the information. Furthermore, this invention relates to improved apparatus for the transmission and receiving sides of a transmission system for the execution of the method.

2. Description of the Prior Art

In transmission techniques, one distinguishes, among other things, transmission systems which operate on a time multiplex basis from transmission systems which operate on a code multiplex basis when connections are to be established between several subscribers. It is characteristic for time multiplex systems that the individual transmission bursts are transmitted with respect to time so that they do not interleave at the summing point of all signals while with the code multiplex technique, the individual transmission channels are steadily in operation and can be distinguished from one another by different code signals. A typical time multiplex method is the so-called "TDMA" technique as it is provided for the application with satellite transmission. A typical code method is the so-called SSMA technique, and this invention is of particular importance for the SSMA technique. The expression "SSMA" is derived from the term "Spread-Spectrum-Multiple-Access Modulation". The SSMA method is primarily applied with satellite transmission paths having multiple access. This technique has, for example, been described in detail in the publication "Proceedings of the IEEE", Volume 54, 1966, pages 763–777. It is essential with the SSMA technique that a fairly large number of transmission stations operate in the same radio frequency range and that signs which are transmitted by the individual stations respectively have a particular code modulation unique unto themselves. This code modulation has two objectives, namely, to expand the individual signal to a larger frequency range and to render the signal recognizable as a code sign for a certain receiving station. Thus, it becomes possible, with respect to the individual receiver, to screen out a certain transmitting station from the frequency spectrum which is received on the basis of its code sign. The code sign of the individual stations is therefor a relatively long sign which includes, for example, ten mega bits. Most often, the individual sign is expressed by means of a phase change of the transmitted high frequency oscillation with respect to the respectively preceding bit. The information itself is additionally impressed onto the code sign in the transmitting station, in particular by the application of a phase shift modulation in such a way that the code sign, which includes relatively many bits, is inverted in its phase with respect to essentially fewer bits when a sign change occurs in the information flow. On the receiving side, the code signal is produced in a code generator which runs synchronously with the transmitting side, and submitted to a multiplication process with the received signal in the radio frequency position or, which is most often the case, in the intermediate frequency position. Due to the multiplication process, the signal power will only appear in the form of an individual spectrum line when the code is received which has not been changed by any additional information. If the code signal is changed on the transmitting side by means of inverting individual phase shift changes in the rhythm of the information flow which, compared with the code signal, only comprises a few bits, information will be obtained from the individual frequency component when the unchanged code signal is received which comprises all frequency components corresponding to the information on the transmitting side. If several transmitting stations operate jointly and simultaneously in the same frequency range, additional frequencies will occur after the multiplication process; however, the power related thereto is usually less than that of the useful signal and such signals can be grouped as noise with respect to the desired information. Therefore, devices for producing a phase-modulated electric oscillation are required with the SSMA technique, both on the transmitting side and the receiving side. However, an essential problem with such devices is that the code signal which is produced in the receiver must be phase synchronous with the code signal which is recorded in the receiver and which comes from the transmission station. The fact that a correct phase position of the output power of a multiplier increases strongly in a narrow frequency range is utilized as recognition criterion for the correct phase position with SSMA receivers. Therefore, a threshold circuit is provided with these receivers in the output of the multiplier from which the criterion for the correct synchronization is derived when a certain threshold value of the output signal is exceeded.

SUMMARY OF THE INVENTION

The present invention is based on the objective to solve the problems of initial synchronization which occur in such systems. This problem is primarily due to the fact that the period of the code which is applied for transmission itself, is relatively long; such a code includes, for example, $10^7$–$10^{10}$ individual elements within one period. The common synchronization with which the code phase of the code in the receiver is shifted stepwise and a phase coincidence test is performed after each step would require far too much time for producing the synchronism in such systems.

The foregoing objective is solved, according to this invention, with a method for the synchronization of the devices on the receiving side with those on the transmitting side in a transmission system operating on a time multiplex or code multiplex basis, in particular a transmission system utilizing the SSMA technique in which the information is transmitted in a broad frequency range with respect to the base band occupied by the information. This is accomplished in such a way that, at the beginning of a transmission from the transmitter, a frequency shift modulated oscillation is radiated with which each frequency element is submitted to a digital phase modulation during transmission which is characteristic for the latter in such a way that the frequency band which is occupied by this signal corresponds at least approximately to the frequency band which is occupied in the usual case of operation in systems heretofore known. On the receiving side, a frequency shift and phase shift modulated oscillation is produced which is equal to the modulated signal and which is submitted to a multiplication process with the oscillation provided in the receiver and shifted until a power maximum results in a narrow frequency band as a result of a multiplication process. Phase synchronization is then derived from this maximum power criterion and effects switching over to normal synchronous operation.

It is advantageous with such a method when the code of the digital phase modulation with a system with code multiplex operation has a period during which is short compared with the code which is provided for transmission in a synchronized state, and when the frequency variation and the variation speed of the frequency shift modulation are selected in such a way that the frequency shift and phase shift modulated signal occupies, at least approximately, the same frequency band as the signal which is provided in the usual case of operation.

A design such that the basic rhythm or timing generator is provided which feeds the code generator itself, a code generator for the digital phase modulation and a code generator for the frequency shift, and that the outputs of the code multiplier for the frequency shift modulation are connected with a high frequency generator, which is also controlled by the basic timing generator, which emits the individual frequencies of the frequency shift modulation, and whose output oscillations are additionally modulated with the digital phase shift signal, is particularly suitable for the execution of such a method on the transmission side.

An advantageous design of such a transmission system on the receiving side is characterized in that reset devices are provided for the code generators to guarantee that after a period of the digital phase shift modulation, both the code generator for the frequency shift modulation and the code generator for the transmission itself are reset to their basic positions.

It is furthermore advantageous when the transmission of a frequency shift and phase shift modulated wave is planned for a time when a synchronization of the receiving station can be safely obtained. An advantageous alternative embodiment hereof is that a signalling possibility is provided to signal from the individual receiving stations to the transmitting station which, when the synchronization of the individual receiving station is attained, causes in the transmitting station a switching over from the frequency and phase shift keyed code signal to the code which is intended to be transmitted.

An advantageous embodiment on the receiving side for such a transmission system is characterized in that a basic rhythm or timing generator is provided which feeds the code generator itself, a code generator for the digital phase modulation and a code generator for the frequency modulation. Furthermore, the outputs of the code modulators for the frequency shift modulation are connected with a high frequency generator which is also controlled by the basic generator, which emits the individual frequencies of the frequency modulation, and whose output oscillations are additionally modulated with the digital phase shift signal. In addition, a multiplier is provided whose input signals are the received signal as well as the frequency and phase shift keyed oscillator signal, and furthermore a frequency and phase shift device is provided for the basic timing generator which, fed by the output of the multiplier, changes frequency and phase of the basic timing generator until a maximum of output power is provided at the output of the multiplier in a given relatively narrow frequency range. When this maximum power output occurs, the frequency and/or phase control of the basic timing generator is discontinued. Advantageously, the basic timing generator which is designed in the receiver in particular as a voltage controlled oscillator is then included in a code phase control loop.

It is furthermore an advantage for the design of such a transmission system on the receiving side thereof if a switching over device is provided in the multiplier output post to connect this post with the code clock generator for the transmission itself, which switching device is operated when the reception of the frequency shift and phase shift modulated signal terminates, and it ends the resetting of the code generator caused by the phase shift modulated code generator.

BRIEF DESCRIPTION OF THE DRAWINGS

Other objects, features and advantages of the invention, its organization, construction and operation will be best understood from the following detailed description of a preferred embodiment thereof taken in conjunction with the accompanying drawings, in which.

DESCRIPTION OF THE PREFERRED EMBODIMENT

Figure 1:
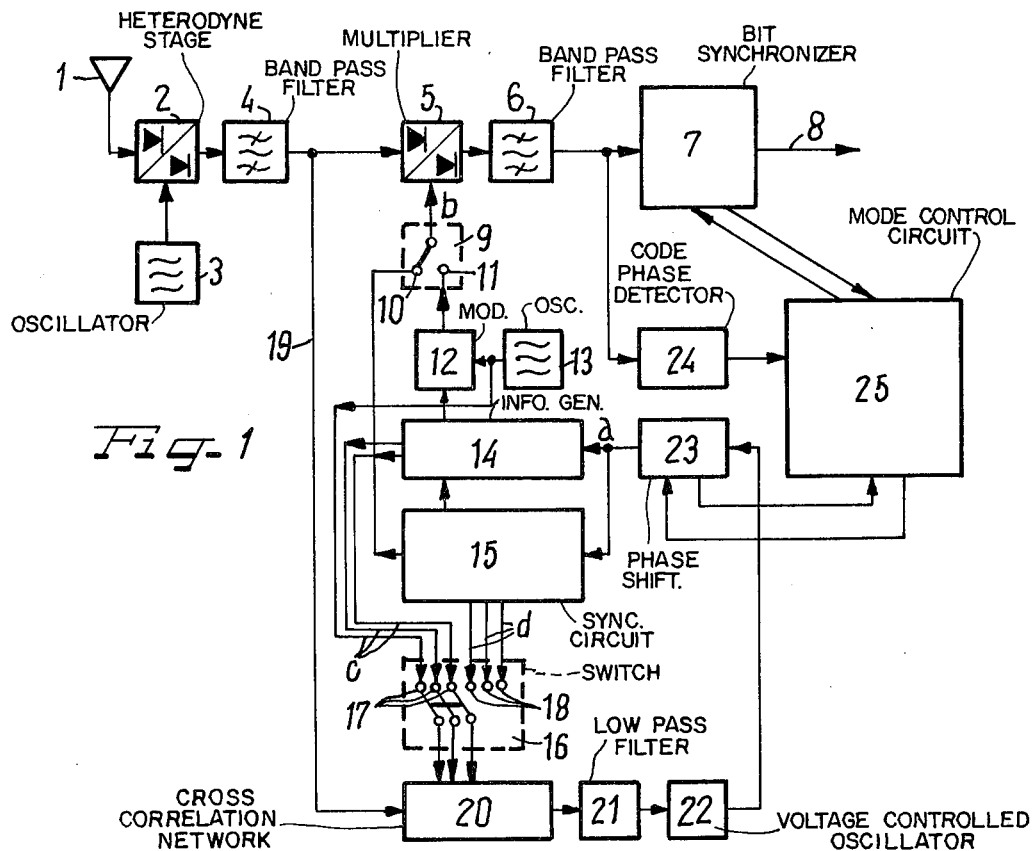
FIG. 1 is a block diagram of an SSMA receiver.

In the receiver illustrated in FIG. 1, a radio frequency signal which occupies, for example, a frequency range of 7250–7270 MHz is received by way of an antenna 1 and extended to a heterodyne oscillator 2 which also receives a heterodyne oscillation at a frequency of, for example, 7190 MHz from an oscillator 3. The intermediate frequency signal with a frequency of 70 MHz ± 10 MHz at the output of the heterodyne oscillator 2 is fed to a band pass filter 4. At the output of the band pass filter 4, the intermediate frequency signal is fed to a multiplier 5, on the one hand, and to a cross-correlation network 20, on the other hand.

The phase-modulated signal which is fed to the multiplier 5 is taken from a multiphase modulator 12 in the case of information transmission in the SSMA channel, via a switch 9 and the contact 11. This multiphase modulator 12 is supplied by an oscillator 13 with a carrier signal and with the code by a information generator 14. If the receiver operates in a manner according to this invention for an initial synchronization, the switch 9 is operated into position engaging the contact 10. Then the output signal of the initial synchronization circuit 15 is applied to the multiplier 5.

The carrier signal which is supplied from the switch 9 to the multiplier 5 is of a different frequency than the intermediate frequency signal at the input of the multiplier 5, namely, in such a way that a second intermediate frequency results at the output of the band pass filter 6, for instance in the frequency position around 20 MHz. The use of a signal which results in the multiplication process at the multiplier 5 is filtered out with the help of the band pass filter 6 which has a band width which is narrow compared to the intermediate frequency band width at the output of the band pass filter 4, but which is still wide compared with the band width determined by the bit succession frequency of the information itself.

In a particular construction utilizing this invention, the band width of the band pass filter 6 was about 50 kHz. A demodulator is connected to the output of the band pass filter 6 with a bit synchronizer 7 for the phase shift modulated useful signal. At the output 8 of the bit synchronizer 7, the received useful information is made available in a regenerated form. In addition to this, the output signal from the band pass filter 6 is fed to a code phase detector 24. The output of the code phase detector 24 supplies a voltage when the phase of the code which is produced in the receiver is almost equal with that of the received code. A strong power increase, compared with the remaining intermediate frequency band, occurring in the direct band center is utilized as a criterion for the recognition of phase equality.

The SSMA demodulator further comprises a control device for the phase tracking of the code which has been generated in the receiver. For this purpose, as it has been mentioned hereinbefore, the output signal of the band pass filter 4 is fed to the cross correlation network 20 via the lines 19. The latter is provided with phase-modulated signals by way of the connection points 17 and/or 18 by means of a switch 16, and these phase-modulated signals are taken from the information code generator 14 during information transmission and, during the initial synchronization, from the switching device 15. The cross correlation network 20 emits a storage signal to a low pass filter 21 in the control loop as soon as a phase differential occurs with respect to the code phase which is to be followed. The output signal of the low pass filter 21 controls a voltage controlled oscillator 22 which provides the timing frequency for the code generator 14 and the circuit for initial synchronization 15. An additional circuit assembly 23 is connected between the circuits 14, 15 and 22 which, controlled by the mode control circuit 25, is able to impress phase shifts onto the output signal of the voltage control oscillator 22 or, synchronized with the frequency of the oscillator 22, is able to emit another frequency at the output thereof.

A mode control serves as a central control point for the many operations which have to be performed in order to be able to put the SSMA receiver into a fully synchronized state in which information transmission can be effected. It must also initiate steps when the synchronization is lost, in order to reestablish synchronization. The following operations must individually be executed:
1. Initial synchronization for obtaining a time reference.
2. Switching over the received code onto the information code.
3. Subsequent synchronization of the code phase of the information code.
4. Carrier synchronization in the PSK demodulator 7.
5. Data synchronization in the bit synchronizer and also in the PSK demodulator 7.
6. Control of the synchronization state of the receiver.

In the following, mainly the method of operation and the circuits which are required therefor will be treated. In this operation, a receiver-time synchronization without ambiguity will be produced with the receiver. This synchronization, however, is not so exact that the synchronization would necessarily remain when one switches over onto the information code. In order to again reach synchronization, phase delay steps are executed by the mode control 25, controlled in the phase shifter 23, which are respectively followed by a code phase coincidence examination. In order to be able to also examine in this receiver leading phase states of the code which is produced in the code phase generator 14 for a coincidence with the code of the received signal, a circuit 23, controlled by the mode control 25, is respectively able to send a defined number of timing pulses with increased frequency to the generator 14. Then, the desired phase values can be searched utilizing delay steps, and proceeding from the code phase value which is then reached. When the phase coincidence is once obtained with an uncertainty of less than one code value, the control loop which is formed by the circuits 20, 21, 22 and 14 can maintain code synchronization. For this case, the circuit 23 operates as a direct through switching device.

The mode of functioning of such a control loop, also called "Delay-Lock-Tracking Loop (DLL)" is, for example, described in the publication "Transactions of the IEEE", Volume AES 2, July 1966, pages 415–421, in detail. Therefore, it is essential that two code signals with a certain phase shifting are supplied by the operating code generator 14 to the cross correlation network 20 by way of switch 16, which is for instance in the position 17. The circuit then has the effect of a code phase discriminator and emits an error voltage as soon as the code which is produced in the receiver is not completely synchronized any longer with that particular received signal. This fault can then be balanced again by means of a subsequent control of the oscillator 22. Furthermore, the cross correlation network 20 must be supplied with the carrier signal, here the output signal of the information code generator 14, of the modulated oscillator oscillation.

Thus, it is decisive to produce frequency and phase coincidence between the code of the received signal and the code which is produced in the receiver. Since with such transmission receiving devices and/or transmission systems codes are applied which consist of very many individual elements, namely, $10^7$ through $10^{10}$ as the usual case, it would be extremely difficult to reach phase synchronization within a reasonable amount of time. With the subject of the present invention this difficulty is overcome in such a way that, before the information transmission is initiated, an initial synchronization is inserted with particular transmission conditions. This initial synchronization comprises a frequency method and a phase shift method, respectively, depending on given code conditions.

Figure 2:
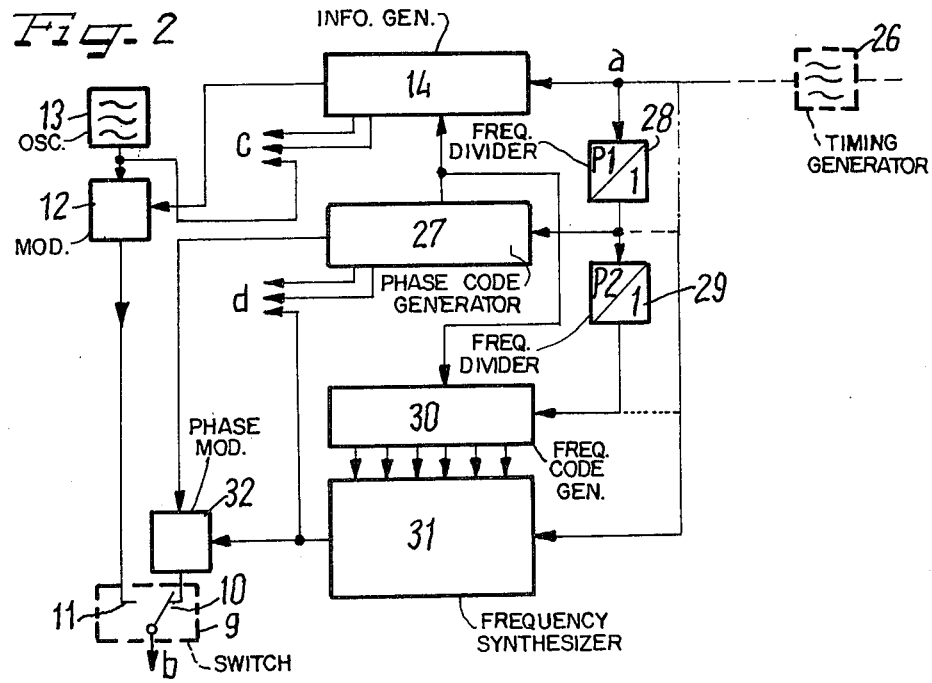
FIG. 2 is a block diagram illustration of a device for initial synchronization of the SSMA receiver according to the present invention.

FIG. 2 illustrates the initial synchronizing device 15 of FIG. 1, which device is divided into individual assemblies, in a form in which it may be inserted both into the transmitter and into the receiver. A code rhythm or timing generator 26 is provided whose phase and frequency may be either fixed in the transmitter or adjusted subsequently corresponding to transit times and a Doppler shifting on the transmission path. If the circuit is subsequently inserted on the receiving side, the output of the phase shifter 23 in FIG. 1 will take the place of the generator output of the code rhythm generator 26. This clock is the basic clock of the code which is to be produced in the transmitter or receiver. It has, for example, a frequency of 10 MHz. The code generator itself is fed by the circuit 26 via a line a, and it may be a feedback shift register with pre-adjustment possibilities. This code generator serves for producing the code which is required for the information transmission itself and which must be frequency and phase synchronous with the code of the received signal. The code generator 14 feeds its code into a phase modulation circuit 12 which is supplied with the output oscillation of the high frequency generator 13 as the oscillation which is to be modulated. Furthermore, a phase code generator 27 and a frequency code generator 30 are provided with the switching diagram according to FIG. 2. The phase code generator 27 feeds a reset circuit in the code generator 14 and a reset circuit in the frequency code generator 30 in such a manner that, when a period is respectively finished in the phase code generator 27, both the code generator 14 and the frequency code generator 27 are reset to their initial positions although they usually have not completed their cycle. The phase code generator 27 is fed by a frequency divider 28 which is inserted between the phase code generator 27 and the basic timing generator 26. The code produced by the phase code generator 27 usually comprises essentially fewer code elements than the code emitted by the code generator 14. The code provided by the code generator 27, for example, has a cycle which comprises about 200–5000 bits when the previously stated values of $10^7$–$10^{10}$ bits are realized for the code of the generator 27.

A further frequency divider 29 is fed by the frequency divider 28 and supplies the frequency code generator 30. This frequency code generator 30 supplies a code with also relatively few elements, such as 100 elements, and it is tuned in connection with the division ratio of circuit 25 and its code elements preferably in such a way that its cycle is longer than the period duration of the code phase generator 27. The period duration of the frequency code generator 30 can also be non-essentially larger than that of the phase code generator 27. The rapid frequency change modulation of the frequency code generator 30, however, should be tuned with the rapid phase change modulation of the phase code generator 27 in such a way that the frequency spectrum at the output of the phase modulator 32 occupies almost the same band width as the frequency spectrum at the output of the phase modulator 12.

The circuit 31 includes a frequency synthesizer, i.e. a frequency generator, which can be adjusted, as desired in its frequency by means of control signals. These adjustments are effected by way of the output lines of the frequency code modulator 30. Its instantaneous content determines which instantaneous frequency shall have the oscillation which is emitted by the circuit 31. In order to guarantee a strict synchronization of the entire process, the circuit 31 is also fed by a generator 26 for synchronization of the output signal. This latter supply can be effected either as indicated by the dot-dash line, directly from the line a or, as indicated, by the line of dashes, from the output of the frequency divider stage 28 in which case the dot-dash connection is either omitted or provided as indicated by the dotted line. The frequency shift modulated signal which is emitted by the circuit 31 is fed into a multiphase modulator, such as the two-phase modulator 32, and the modulator 32 is supplied with the output impulse succession of the phase code generator 27 for a phase shift keying of this signal. Thus, there is a rapid frequency change modulated signal at the output of the multiphase modulator 32 whereby this signal is additionally phase shift modulated with the code of the generator 27 within a period of time with a fixed instantaneous frequency. Furthermore, FIG. 2 includes the switch 9 which has been illustrated in FIG. 1, whose output b may be connected selectively, via the contact 11, with the modulator 12 or, via the contact 10, with the phasemodulator 32. As long as no initial synchronization has been reached, the switch 9, as it has been mentioned before, is conditioned to engage the contact 10. Thus, a frequency shift and phase shift modulated signal is produced in the transmitter and in the receiver. The circuit as shown in FIG. 2 is practically the same in the transmitter and in the receiver. In the receiver, however, still further output signals of the generators 13 and 14 are required for feeding the cross correlation network 20. These outputs are jointly referenced c; the same is valid for the phase code generator 27 which has additional outputs referenced d. Furthermore, the output oscillation of the oscillator 13, as well as that of the synthesizer 31, must be included in the line bundles c and d of the cross correlation network 20. During the initial synchronization period, the cross correlation network 20 will receive signals on the lead d from the circuit according to FIG. 2 via the switch 16 of FIG. 1 and to the switching position 18, while, during a normal operation, it receives the signals of the lead c via the switch 16 in the position 17. From the information code generator 14, two lines are extended to the cross correlation network by way of the lead c and the switching position 17 of the switch 16, since their correlation network 20 requires two mutually phase shifted code signals for phase discrimination in a manner which is known per se. The cross correlation network 20 also requires the center frequency of the phase-modulated signal which is present at the output b of the switch 9. Two lines extend from the phase code generator 27 to the switching position 18 by way of the lead d, since, as it has been mentioned above, the cross correlation network 20 requires two mutually phase shifted code signals for phase discrimination. For the same reason, the group of lines d must therefor also transmit the output oscillation of the synthesizer 31.

The mode of operation of the circuit according to FIG. 2 in the framework of a transmitter and the receiver according to FIG. 1, can be as follows:

As long as no synchronization is present in the receiver, the initial synchronizing device will steadily attempt in the receiver to produce a code synchronization with a possibly present signal-to-be-received. For this purpose, the phase-delay steps of the code clock will be steadily provided by the circuit 23 in response to operation of the mode control 25. Due to this operation the phase of the code which is produced in the generators 27 and 30 is changed with respect to a possibly present received signal. After each phase delay step is carried out, a coincidence test will be effected at the detector 24. The time interval is required for searching a code phase element, which becomes longer when the signal/noise ratio decreases and may be, for example, ten ms. If the coincidence test is negative, a further phase delay step is effected. If actually a signal-to-be-received is provided, phase coincidence will occur in a worst case situation when all code phase elements of a code period of p elements are examined. With a phase duration of, for example, 2000 elements, the searching time is then 20 s. If the phase coincidence is given, the mode control 25 will cease supply and control impulses to the circuit 23, and the control loop can maintain the code phase synchronism. In order to be able to merely examine the code phase of the phase code which is produced by the phase code generator 27, it is important that one single instantaneous frequency of the frequency shift modulation can clearly be assigned to the respective individual code elements. With the circuit according to FIG. 2 this is obtained in such a way that both generators are fed by the same source 26 and that the generator 27 resets the generator 30 back to its initial position after completing a full code cycle. The generator 14 is also reset into its initial position. Thus, a clear assignment is given of the code elements, which code elements are produced during the initial synchronization time, to those of the code which is produced by the code generator 27.

Heretofore it has been required that the transmitter steadily send a frequency shift and phase shift modulated signal which has been produced in a circuit according to FIG. 2. After a certain time, which is given by the signal/noise conditions on the transmission path, the transmitter can readily assume that the receiver has synchronized and therefore switches over to the information code. This is effected at just that time when the generator 27 has passed an entire code period and has brought the information code generator 14 into its initial position. The receiver which still operates with the signal which is determined to be utilized for initial synchronization will receive the loss of this signal through the means of the detector 24. Controlled by the mode control 25, the reset lines a to the generators 14 and 30 are then disconnected from the generator 27. Furthermore, the switch 9 is conditioned to the position 11 and, likewise, the switch 16 is conditioned into the position 18. This measure guarantees that the code which is generated in the receiver at the information generator 14 is almost synchronous with the code of the signal which is to be received. Since, however, the receiver runs freely immediately after the code disappears (the code being used for initial synchronization) one must take into consideration that a phase difference of several bits may have built up between the two codes. This difference, however, will not exceed an upper limit of, for example, 500 elements. Therefore, while the mode control 25 is operating, a subsequent synchronization process will be carried out as has been described above. As soon as the code phase difference has been decreased to less than one code element, the code phase synchronization can be assumed by the subsequent control loop formed by the circuits 20, 21, 22, 23 and 14. Therefore, a carrier synchronization becomes possible in the demodulator for the phase shift modulator signal, which carrier synchronization is followed by the synchronization of the bit synchronizer 7. The channel consisting of transmitter, transmission path and receiver is then ready for information transmission.

In place of a switch-over operation in the transmitter from the frequency and phase shift keyed signal onto a signal which is phase shift keyed with the communication code after the expiration of a fixed period of time that is longer than the maximum initial synchronization time, the corresponding switching can be effected immediately after the initial synchronization is obtained through the utilization of a reverse message from the receiver to the transmitter. However, then a particular transmission path is required from the receiving station to the transmitting station.

Although I have described my invention by reference to a specific illustrated embodiment thereof, many changes and modifications may become apparent to those skilled in the art without departing from the spirit and scope of my invention, and it is to be understood that I intend to include within the patent warranted hereon all such changes and modifications as may reasonably and properly be included within the scope of my contribution to the art.

What I claim as my invention is:

1. A method of synchronizing the transmitting and receiving apparatus of a transmission system which operates on a time or code multiplex SSMA basis wherein information is transmitted in a broad frequency band compared to the base band normally occupied thereby, comprising the steps of: at the transmitting apparatus, frequency shift modulating an oscillation and digitally phase modulating each frequency element of the frequency modulated oscillation with a unique phase modulation, and transmitting the dual modulated signal at the beginning of information transmittal; and at the receiving apparatus, receiving the dual modulated signal; producing a frequency and phase modulated signal equal to that received; multiplying the produced signal with respect to its phase while comparing the power thereof with the power of the received signal to detect a power maximum of the multiplied signal in a narrow frequency band, and switching to operation under the control of a locally produced oscillation for normal synchronous conditions in response to maximum power detection.

2. A method according to claim 1, wherein for operation on a code multiplex basis the steps of digital phase modulation is further defined as modulating with a code having a period duration which is short compared to the period duration of the communication code.

3. Transmitting apparatus for synchronous operation of a transmission system which operates on a time or code multiplex SSMA basis wherein information is transmitted in a frequency band which is broader than the band normally occupied thereby, comprising: a basic clock generator; a communication code generator connected to and driven by said clock generator; a frequency shift code generator connected to and driven by said clock generator; a phase shift code generator connected to and driven by said clock generator; a high frequency generator connected to and driven by said clock generator and inserted between said frequency shift code generator and said phase shift code generator for providing the individual frequencies of the frequency shifted signals to said phase shift generator for phase shift modulation.

4. Transmitting apparatus according to claim 3, wherein said frequency and phase shift code generators are of a reset type and include means responsive to the termination of phase shifting to reset said generators to respective initial positions.

5. Receiving apparatus for synchronous operation of a transmission system which operates on a time or code multiplex SSMA basis wherein information is transmitted in a frequency band which is broader than the band normally occupied thereby and includes a first frequency and phase modulated signal for initial synchronization, comprising: a basic timing generator; a frequency shift modulation code generator connected to and driven by said timing generator; a high frequency generator connected to and operated by said timing generator and said frequency shift code generator to produce inidivudal frequency shift modulated frequencies; a digital phase shift code generator connected to receive the frequency shift modulated signal and connected to and driven by said timing generator to phase code modulate the signal as a second frequency and phase modulated signal; means for receiving the first phase and frequency modulated signal, a multiplier for receiving the first and second frequency and phase modulated signals; means connected between said multiplier and said timing generator for changing the frequency and phase of the timing generator until a maximum power output is provided at said multiplier within a narrow frequency band; and means operable to reset said frequency and phase shift code generators in response to said maximum power output.

6. Receiving apparatus system according to claim 5, comprising: an information code generator; means for switching said multiplier to the information code generator in response to the maximum power output condition.

7. A transmission system operating on a line or code multiplex SSMA basis wherein means are provided for transmitting information in a broad frequency band compared to the base band normally occupied thereby and preceded by a frequency and phase shifted synchronization signal, comprising: at a transmitting station means for frequency shift modulating an oscillation, means for phase shift modulating the frequency shift modulated oscillations and means for transmitting the frequency and phase shift modulated oscillations prior to the transmission of information; and at a receiving station, means for producing frequency and phase shift modulated oscillations equal to that produced at the transmitting station, means for multiplying the two dual modulated oscillations, means for changing the frequency and phase shift modulation of the receiver modulated oscillations until maximum power condition exists at the output of said multiplying means, and means operable in response to said maximum power condition to switch said receiving station to normal synchronous operation.

8. A transmission system according to claim 7, comprising: means at said transmitting station for switching operation thereof from the transmission of frequency and phase shifted oscillations to information transmission; and means at said receiving station for sending a revertive signal to said transmitting station to control said switching means in response to detection of said maximum power condition.

* * * * *